(12) United States Patent
Iftime et al.

(10) Patent No.: US 8,597,420 B2
(45) Date of Patent: Dec. 3, 2013

(54) SOLVENT-BASED INKS COMPRISING COATED MAGNETIC NANOPARTICLES

(75) Inventors: Gabriel Iftime, Mississauga (CA); Peter G. Odell, Mississauga (CA); C. Geoffrey Allen, Waterdown (CA); Marcel P. Breton, Mississauga (CA); Richard P. N. Veregin, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 41 days.

(21) Appl. No.: 13/050,152

(22) Filed: Mar. 17, 2011

(65) Prior Publication Data

US 2012/0235075 A1 Sep. 20, 2012

(51) Int. Cl.
*C09D 11/02* (2006.01)

(52) U.S. Cl.
USPC .... 106/31.65; 106/31.6; 106/31.9; 106/31.92

(58) Field of Classification Search
USPC .......... 106/31.6, 31.65, 31.9, 31.92; 252/62.55, 62.54, 62.53
See application file for complete search history.

(56) References Cited

U.S. PATENT DOCUMENTS

| | | | |
|---|---|---|---|
| 4,463,034 A | 7/1984 | Tokunaga et al. | |
| 5,866,637 A | 2/1999 | Lorenz | |
| 6,262,129 B1 * | 7/2001 | Murray et al. | 516/33 |
| 6,767,396 B2 | 7/2004 | McElligott et al. | |
| 7,407,572 B2 | 8/2008 | Steffens et al. | |
| 2006/0003163 A1 * | 1/2006 | Mayes | 428/407 |
| 2006/0142419 A1 * | 6/2006 | Xu et al. | 523/161 |
| 2007/0249747 A1 | 10/2007 | Tsuji et al. | |
| 2009/0321676 A1 | 12/2009 | Breton et al. | |
| 2010/0015472 A1 | 1/2010 | Bradshaw et al. | |
| 2010/0060539 A1 * | 3/2010 | Suetsuna et al. | 343/787 |
| 2010/0292467 A1 | 11/2010 | Goredema et al. | |
| 2010/0304006 A1 | 12/2010 | Delpech et al. | |

FOREIGN PATENT DOCUMENTS

WO    WO 2008148201 A1 * 12/2008

* cited by examiner

*Primary Examiner* — Kaj K Olsen
*Assistant Examiner* — Veronica F Faison
(74) *Attorney, Agent, or Firm* — Pillsbury Winthrop Shaw Pittman LLP

(57) ABSTRACT

Solvent-based ink compositions which can be used for ink jet printing in a variety of applications. In particular, the present embodiments are directed to magnetic inks having desirable ink properties. The ink of the present embodiments comprises magnetic nanoparticles that are coated with various materials to prevent the exposure of the nanoparticles to oxygen, and provides robust prints.

14 Claims, 2 Drawing Sheets

SOLVENT-BASED INKS COMPRISING COATED MAGNETIC NANOPARTICLES

CROSS REFERENCE TO RELATED APPLICATIONS

Reference is made to commonly owned and co-pending, U.S. patent application Ser. No. 13/050,268 entitled "Curable Inks Comprising Inorganic Oxide-Coated Magnetic Nanoparticles" to Iftime et al.; U.S. patent application Ser. No. 13/050,423 entitled "Curable Inks Comprising Coated Magnetic Nanoparticles" to Iftime et al.; U.S. patent application Ser. No. 13/050,223 entitled "Solvent-Based Inks Comprising Coated Magnetic Nanoparticles" to Iftime et al; U.S. patent application Ser. No. 13/050,403 entitled "Magnetic Curable Inks" to Iftime et al.; U.S. patent application Ser. No. 13/049,936 entitled "Phase Change Magnetic Ink Comprising Carbon Coated Magnetic Nanoparticles And Process For Preparing Same," to Iftime et al.; U.S. patent application Ser. No. 13/049,937 entitled "Solvent Based Magnetic Ink Comprising Carbon Coated Magnetic Nanoparticles And Process For Preparing Same" to Iftime et al.; U.S. patent application Ser. No. 13/049,942 entitled "Phase Change Magnetic Ink Comprising Coated Magnetic Nanoparticles And Process For Preparing Same" to Iftime et al.; U.S. patent application Ser. No. 13/049,945 entitled "Phase Change Magnetic Ink Comprising Inorganic Oxide Coated Magnetic Nanoparticles And Process For Preparing Same" to Iftime et al.; U.S. patent application Ser. No. 13/050,341 entitled "Curable Inks Comprising Surfactant-Coated Magnetic Nanoparticles" to Iftime et al.; U.S. patent application Ser. No. 13/050,383 entitled "Curable Inks Comprising Polymer-Coated Magnetic Nanoparticles" to Iftime et al.; U.S. patent application Ser. No. 13/049,950 entitled "Phase Change Magnetic Ink Comprising Surfactant Coated Magnetic Nanoparticles and Process for Preparing the Same" to Iftime et al.; and U.S. patent application Ser. No. 13/049,954 entitled "Phase Change Magnetic Ink Comprising Polymer Coated Magnetic Nanoparticles and Process for Preparing the Same" to Iftime et al., all filed electronically on the same day as the present application, the entire disclosures of which are incorporated herein by reference in its entirety.

BACKGROUND

Non-digital inks and printing elements suitable for Magnetic Ink Character Recognition (MICR) printing are generally known. The two most commonly known technologies are ribbon-based thermal printing systems and offset technology. For example, U.S. Pat. No. 4,463,034 discloses heat sensitive magnetic transfer element for printing MICR, comprising a heat resistant foundation and a heat sensitive imaging layer. The imaging layer is made of ferromagnetic substance dispersed in a wax and is transferred on a receiving paper in the form of magnetic image by a thermal printer which uses a ribbon. U.S. Pat. No. 5,866,637 discloses formulations and ribbons which employ wax, binder resin and organic molecule based magnets which are to be employed for use with a thermal printer which employs a ribbon. MICR ink suitable for offset printing using a numbering box are typically thick, highly concentrated pastes consisting for example in about over 60% magnetic metal oxides dispersed in a base containing soy-based varnishes. Such inks are, for example, commercially available at Heath Custom Press (Auburn, Wash.). Digital water-based ink-jet inks composition for MICR applications using a metal oxide based ferromagnetic particles of a particle size of less than 500 microns are disclosed in U.S. Pat. No. 6,767,396. Water-based inks are commercially available from Diversified Nano Corporation (San Diego, Calif.).

The present embodiments relate to solvent-based ink compositions. These ink compositions can be used for ink jet printing in a variety of applications. In addition to providing desirable ink quality, the present embodiments are directed to magnetic inks for use in specific applications. The ink of the present embodiments comprises magnetic nanoparticles that are coated with various materials to prevent the exposure of the nanoparticles to oxygen. The present embodiments are also directed to a solvent-based magnetic ink that provides robust prints.

The present embodiments are directed to solvent-based magnetic inks which comprise an organic solvent, an optional dispersant, an optional synergist, an optional antioxidant, an optional viscosity controlling agent, an optional colorant, and coated magnetic nanoparticles comprising a magnetic core and a coated shell disposed or deposited thereover. These magnetic inks are required for specific applications such as Magnetic Ink Character Recognition (MICR) for automated check processing and security printing for document authentication. One of the challenges in formulating such a solvent-based ink, however, is that many of these metal nanoparticles are pyrophoric and extremely sensitive to air and water. For example, iron nanoparticles can burst into flame instantly upon exposure to air. As such, uncoated magnetic metal nanoparticles are a serious fire hazard. As such, large scale production of the solvent-based inks comprising such particles is difficult because air and water need to be completely removed when handling the particles. In addition, the ink preparation process is particularly challenging with magnetic pigments because inorganic magnetic particles are incompatible with organic base components. Lastly, a problem associated with the use of the magnetic solid inks is the solid ink vehicle is designed for normal office use and not the highly abrasive environment of multiple passes through a magnetic reader. As a result, a magnetic solid ink print may wear off quickly during machine-reading process, either for MICR or for document authentication procedures.

Thus, there is a need for a magnetic ink which can be printed with piezoelectric print-heads and which can be made both safely and provides robust prints compatible with solvent-based compositions.

Thus, while the disclosed solid ink formulation provides some advantages over the prior formulations, there is still a need to achieve a formulation that not only provides the desirable properties of a solvent-based ink but is also more easily produced and derived from components that do not require special handling conditions.

SUMMARY

According to embodiments illustrated herein, there is provided a magnetic ink comprising an organic solvent; a coated magnetic nanoparticles comprising a magnetic core and a shell disposed or deposited thereover, an optional dispersant; an optional synergist; an optional antioxidant; an optional viscosity controlling agent; an optional colorant; and an optional binder.

In particular, the present embodiments provide a magnetic ink comprising: an organic solvent carrier; an optional dispersant; an optional synergist; an optional antioxidant; an optional viscosity controlling agent; an optional colorant; an optional binder; and coated magnetic nanoparticles, wherein the coated magnetic nanoparticles are comprised of a magnetic metal core and a protective coating deposited on the magnetic metal core, and further wherein the coated magnetic nanoparticles are dispersed in the solvent carrier.

In further embodiments, there is provided a magnetic ink comprising: a solvent carrier; an optional dispersant; an optional synergist; an optional antioxidant; an optional viscosity controlling agent; an optional colorant; an optional binder; and coated magnetic nanoparticles comprising a magnetic metal core and a protective coating deposited on the magnetic metal core, wherein the coated magnetic nanoparticles are dispersed in the solvent carrier and further wherein the ink is used for Magnetic Ink Character Recognition (MICR) applications.

In yet other embodiments, there is provided a process for preparing a magnetic ink comprising: (a) preparing a solution by combining an organic solvent, an optional dispersant, an optional synergist, and an optional colorant; and (b) combining the solution of (a) with a coated magnetic nanoparticle comprising a magnetic core and a coating shell deposited on the magnetic core to form a magnetic ink.

BRIEF DESCRIPTION OF THE DRAWINGS

For a better understanding of the present embodiments, reference may be had to the accompanying figures.

DETAILED DESCRIPTION

Figure 1:
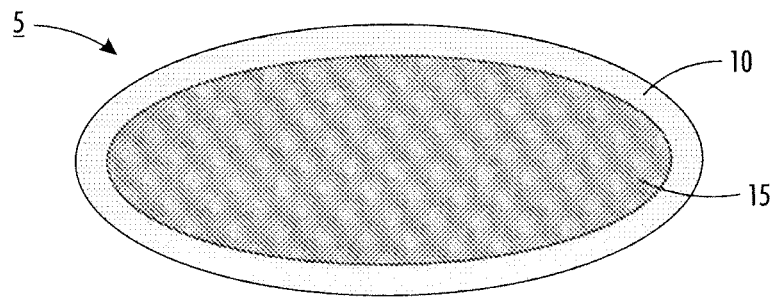
FIG. 1 illustrates a cross-section of a coated magnetic nanoparticle according to the present embodiments.

In the following description, it is understood that other embodiments may be utilized and structural and operational changes may be made without departure from the scope of the present embodiments disclosed herein.

Solvent ink technology broadens printing capability and customer base across many markets, and the diversity of printing applications will be facilitated by effective integration of printhead technology, print process and ink materials. As discussed above, while current ink options are successful for printing on various substrates, there is a need for a less complicated method to produce magnetic solvent inks comprising magnetic metal nanoparticles which avoids the safety risks associated with the nanoparticles. In addition, solvent-based magnetic inks provide for enhanced robustness of the prints.

The present embodiments are directed generally to solvent-based magnetic solid inks. In particular, the present embodiments provide inks that are made with coated magnetic metal nanoparticles dispersed in a solvent ink base. One of the inherent properties of uncoated magnetic metal nanoparticles which precludes their use in the fabrication of commercial inks is their pyrophoric nature; uncoated (bare) magnetic nanoparticles of a certain size, typically in the order of a few tens of nanometers or less, ignite spontaneously when exposed to oxygen in the ambient environment. For example, bare iron, cobalt and alloys nanoparticles are a serious fire hazard. Thus, the present embodiments provide a safe method for preparation of stable inks suitable for applications that require the use of magnetic inks. The present embodiments provide coated magnetic metal nanoparticles which are protected from exposure to water and air. These nanoparticles have a coating of various materials, such as for example, carbon, polymers, inorganic oxides, surfactants, or mixtures thereof, which acts as a barrier to water or air.

Magnetic inks are required for two main applications: (1) Magnetic Ink Character Recognition (MICR) for automated check processing and (2) security printing for document authentication. The resulting solvent-based ink can be used for these applications. Moreover, as mentioned above, solid ink compositions are not normally designed for multiple passes across a magnetic reader. Thus, magnetic solid ink print may wear off during the machine-reading process, either for MICR or for document authentication procedures. The present embodiments provide a magnetic ink that is solvent-based. More specifically, the ink of the present embodiments is made by dispersing coated magnetic metal nanoparticles in a solvent-based composition containing a solvent, an optional viscosity controlling agent, an optional dispersant, an optional synergist and optional binder. These solvent-based inks comprising the coated magnetic nanoparticles are jetted as a liquid dispersion onto the print substrate. Because the ink is in a liquid state when applied to the substrate, such as paper, the magnetic ink penetrates into the substrate when printed. In contrast to conventional solid inks which sit on top of the substrate, the solvent carrier allows the ink of the present embodiments to penetrate the substrate coating and fibers to ensure deposition of the ink components. As a result, the inks proved robust magnetic prints that can pass the machine-reading process steps of MICR or document authentication procedures, and be overprinted with other ink types. The added robustness also removes the need for adding a clear protective overcoat layer over the print, which increases the amount of ink used and adds to the pile height of the printed documents.

The resulting solvent ink can also be applied using with piezoelectric inkjet print heads. Currently only water based MICR inkjet ink are commercially available. Water based inks require special care of the printhead to prevent evaporation of the ink or deposition of salts within the channel rendering the jetting ineffective. Furthermore high quality printing with aqueous inks generally requires specially treated image substrates. In addition, there is generally a concern with respect to possible incompatibility when operating both organic materials based inks like solid, solvent or curable solid inks and water-based inks within the same printer. Issues like water evaporation due to the proximity to the organic heated ink tanks, rust, high humidity sensitivity of the organic inks are key problems which may prevent implementation of the water-based MICR solution. Thus, the present embodiments further avoid these issues.

The present embodiments provide a solvent-based ink made from coated metal magnetic nanoparticles dispersed in a solvent-based ink base. The process of ink fabrication comprise the following key steps: (1) preparation of a solvent solution containing appropriate dispersant and optionally a synergist; (2) addition and breaking of solid aggregates of the coated nanoparticles (this step can be achieved by various processes including ball milling, attrition or high speed homogenizer mixing); (3) optional addition of viscosity controlling agents; and (4) filtration of the ink.

The inks are suitable for use in various applications, including MICR applications. In addition, the printed inks may be used for decoration and for security printing purposes, even if the resulting inks do not sufficiently exhibit coercivity and remanence suitable for use in MICR applications. The ink of the present disclosure exhibits stability, dispersion properties and magnetic properties that are superior to that of an ink including magnetite.

Figure 2:
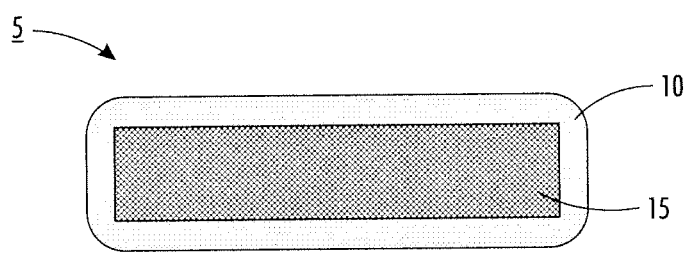
FIG. 2 illustrates a cross-section of a coated magnetic nanoparticle according to an alternative embodiment to FIG. 1.
Figure 3:
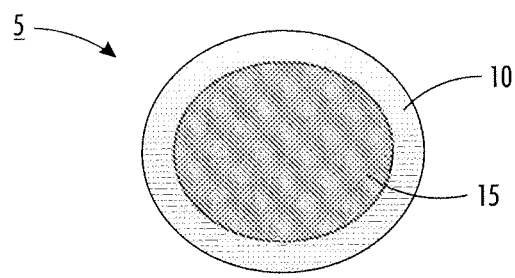
FIG. 3 illustrates a cross-section of a coated magnetic nanoparticle according to an alternative embodiment to FIG. 1 or FIG. 2.

The coated magnetic nanoparticles 5 are made of a core magnetic nanoparticle 15 coated on the surface with a coating material 10 as shown in FIGS. 1-3. The coated magnetic nanoparticles can be produced to have different shapes such as oval (FIG. 1), cubed (FIG. 2), and spherical (FIG. 3). The shapes are not limited to those depicted in these three figures. Suitable coating materials may include a variety of materials, including for example, carbon, polymers, inorganic oxides, surfactants and mixtures thereof. Carbon materials may be selected from the group consisting of amorphous carbon, glassy carbon, graphite, carbon nanofoam, diamond and the like, and mixtures thereof. Polymeric materials may be selected from the group consisting of amorphous, crystalline, low molecular weight, high molecular weight, polymers, homopolymers, copolymers made of one or more types of monomers, and the like, and mixtures thereof. Inorganic oxides may be selected from the group consisting of silica, titanium oxide, iron oxide, zinc oxide, aluminum oxide, and the like, and mixtures thereof. Surfactants may be selected from the group consisting of anionic, cationic, non-ionic, zwitterionic surfactants, and the like, and mixtures thereof.

The magnetic ink is made by dispersing the coated nanoparticles in a solvent ink base. The coating present on the surface of the nanoparticles provides air and moisture stability such that the nanoparticles are safe to handle.

Solvent Carrier Material

The ink composition includes a carrier material, or a mixture of two or more carrier materials. In the present embodiments, there is provided a liquid inkjet ink composition in which the carrier is one or more organic solvents.

In the present embodiments, the coated magnetic metal nanoparticles are dispersed into the solvent ink base. The solvent may be selected from the group consisting of isoparaffins like ISOPAR® manufactured by the Exxon Corporation, hexane, toluene, methanol, ethanol, n-propanol, n-butanol, benzyl alcohol, methyl cellosolve, ethyl cellosolve, acetone, methyl ethyl ketone, cyclohexanone, chlorobenzene, methyl acetate, n-butyl acetate, dioxane, tetrahydrofuran, methylene chloride and chloroform, and mixtures and combinations thereof. Additional commercially available hydrocarbon liquids that may be used include, for example, the NORPAR series available from Exxon Corporation, the SOLTROL series available from the Phillips Petroleum Company, and the SHELLSOL series available from the Shell Oil Company. In embodiments, the solvent is present in the overall ink composition in an amount of from about 0.1 to about 99 percent, or of from about 10 to about 90 percent, or of from about 30 to about 90 percent by weight of the total weight of the ink, although the specific amount can be outside of these ranges.

In embodiments, the ink exhibits a viscosity, typically on the order of less than 15 centipoise (cP) or about 2 to 12 cP at jetting temperature (jetting temperature ranging from about 25° C. to about 140° C.

Coating Materials for Magnetic Metal Nanoparticles

Various materials may be used for the nanoparticle coating materials, for example, carbon, polymers, inorganic oxides, surfactants and mixtures thereof. The coating is disposed on the surface of the magnetic metal nanoparticles and may have a layer thickness of from about 0.2 nm to about 100 nm, or from about 0.5 nm to about 50 nm, or from about 1 nm to about 20 nm.

Carbon coated magnetic nanoparticles are commercially available (for example from Nanoshel Corporation (Wilmington, Del.). Carbon coated metal nanoparticles are typically produced by a laser evaporation process. For example, graphite layer coated nickel nanoparticles of diameters comprised between 3 and 10 nm were produced by laser ablation techniques (Q. Ou, T. Tanaka, M. Mesko, A. Ogino, M. Nagatsu, Diamond and Related materials, Vol. 17, Issues 4-5, pages 664-8, 2008). In a different approach, carbon coated iron nanoparticles were prepared by carbonizing polyvinyl alcohol using iron as a catalyst in hydrogen flow (Yu Liang An. et al., Advanced Materials Research, 92, 7, 2010). Alternatively, carbon coated ion nanoparticles were prepared by using an annealing procedure. The procedure induced carbonization of a stabilizing organic material-3-(N,N-Dimethyllaurylammonio)propane sulfonate— which was used to stabilize the pre-formed iron nanoparticles. The process is performed under flow of hydrogen to ensure carbonization process. The carbon shell was found to effectively protect the iron core from oxidation in acidic solutions (Z. Guo, L. L. Henry, E. J. Podlaha, ECS Transactions, 1 (12) 63-69, 2006).

Various polymers are suitable for producing protective coating layers for the magnetic metal cores in nanoparticles. Suitable examples include Poly(methyl methacrylate) (PMMA), polystyrene, polyesters, and the like. Polymers can be homopolymers or copolymers, linear or branched, random and block copolymers.

Coatings and methods for coating particles with polymers layers are described in, for example, Caruso, F., Advanced Materials, 13: 11-22 (2001). Polymer coated nanoparticles can be obtained via synthetic and non synthetic routes: polymerization of the particle surface; adsorption onto the particles; surface modifications via polymerization processes; self-assembled polymer layers; inorganic and composite coatings including precipitation and surface reactions and controlled deposition of preformed inorganic colloids; and use of biomacromolecular layer in specific applications. A number of techniques for the preparation of magnetic nano- and micronized particles are also described in Journal of Separation Science, 30: 1751-1772 (2007). Polystyrene-coated cobalt nanoparticles are described in U.S. Publication No. 2010/0015472 to Bradshaw, which is hereby incorporated by reference. The disclosed process consists of thermal decomposition of dicobalt octacarbonyl in dichlorobenzene as a solvent in the presence of a polystyrene polymer terminated with a phosphine oxide group and an amine terminated polystyrene, at 160° C. under argon. The process provided magnetic cobalt nanoparticles having a polymer coating including a polystyrene shell. Additionally, other polymer shells can be placed on the surface of the coated cobalt nanoparticles by exchange of the original polystyrene shell with other polymers. The reference further describes replacement of the polystyrene shell on coated nanoparticles by polymethylmethacrylate shell, through exchange reaction with polymethyle methacrylate (PMMA) in toluene. These polymer coated magnetic nanoparticle materials are also suitable for fabrication of magnetic inks. U.S. Publication No. 2007//0249747 to Tsuji et al. discloses fabrication of polymer-coated metal nanoparticles from magnetic FePt nanoparticles of a particle size of about 4 nm by stirring FePt nanoparticle dispersion in the presence of a—SH terminated polymer. Suitable polymers include PMMA.

The surface of magnetic nanoparticles can be modified: by grafting; atom transfer radical polymerization (ATRP) and reversible addition—fragmentation chain transfer (RAFT) polymerization techniques (the latter using a chain transfer agent but no metal catalyst); solvent evaporation method; layer by layer process; phase separation method; sol-gel transition; precipitation technique; heterogeneous polymerization in the presence of magnetic particles; suspension/emulsion polymerization; microemulsion polymerization; and dispersion polymerization.

In addition to the known methods described above, a number of specific techniques are of interest, such as for example, use of sonochemistry for chemical grafting of anti-oxidant molecules with additional hydrophobic polymer coating directly onto $TiO_2$ particle surfaces (Chem. Commun., 4815-4817 (2007)); use of pulse-plasma techniques (J. of Macromolecular Science, Part B: Physics, 45: 899-909 (2006)); use of supercritical fluids and anti-solvent process for coating/encapsulation of microparticles with a polymer (J. of Supercritical Fluids, 28: 85-890 (2004)); and use of electrohydrodynamic atomization for the production of narrow-size-distribution polymer-pigment-nanoparticle composites.

Suitable inorganic oxides for use as coating materials include silica, titania, zinc oxide and other similar inorganic oxides and mixtures thereof.

Methods for fabrication of such core-shell particles having a protective layer (shell) made out of inorganic oxide are described in, for example, U.S. Patent Publication No. 2010/0304006 describes a method wherein the silica coating on the surface of metal nanoparticles is provided by catalytic hydrolysis of a tetraalkoxysilane on the surface of metal nanoparticles. In order to avoid direct access of water to the surface of the metal nanoparticles, the process is carried in a medium containing an organic solvent like tetrahydrofuran (THF), in presence of only the required amount of water needed for hydrolysis/condensation of the silica precursor. Coated magnetic nanoparticles made by this method include Fe, Fe/Co alloys.

Bomati-Miguel et al., Journal of Magnetism and Magnetic Materials, 290-291: 272-275 (2005) describes one-step fabrication of silica coated iron nanoparticles by a continuous process involving laser-induced pyrolysis of ferrocene (the source of iron metal) and TEOS aerosols (the source of siloxane protective coating).

Ni et al., Materials Chemistry and Physics, 120: 206-212 (2010) reported deposition of a silica layer on iron nanoparticles dispersed in ethanol solution containing tetraethyl orthosilicate (TEOS) in presence of catalytic amounts of a solution of ammonia.

The general procedure for fabrication of metal oxide coated magnetic metal nanoparticles is based on controlled partial oxidation of the top layers of magnetic metal nanoparticles. For example, as disclosed in Turgut, Z et al., Journal of Applied Physics, 85 (8, Pt. 2A): 4406-4408 (1999), a thin iron oxide/cobalt oxide coating layer on FeCo nanoparticles was prepared by controlled oxidation of metal precursors particles with a plasma torch (Turgut, Z et al., Journal of Applied Physics (1999), 85(8, Pt. 2A), 4406-4408).

Various surfactants can be present on the surface of the magnetic metal nanoparticles. Examples include oleic acid, oleyl amine, hexyl phosphonic acid (HPA), trioctyl phosphine oxide (TOPO), 1-butanol, tributyl phosphine and others.

Typically the surfactant-coated nanoparticles are provided by performing the fabrication of metal nanopaticles from metal precursors, in the presence of a suitable surfactant in a solvent. Suitable methods providing surfactant coated magnetic metal nanoparticles in solvent include metal salts reduction by borohydrides (I. Guo et al. Phys. Chem. Chem. Phys., 3: 1661-5 (2001); reduction of metal salts by polyols (G. S. Chaubey et al., J. Am. Chem. Soc., 120: 7214-5 (2007)); and thermal decomposition of metal carbonyls (U.S. Pat. No. 7,407,572).

All of the above methods may be used to provide suitable coated magnetic nanoparticles needed for fabrication of a magnetic solvent ink according to the present embodiments.

Magnetic Material

In embodiments, two types of magnetic metal based inks can be obtained by the process herein, depending on the particle size and shape: ferromagnetic ink and superparamagnetic ink.

In embodiments, the metal nanoparticles herein can be ferromagnetic. Ferromagnetic inks become magnetized by a magnet and maintain some fraction of the saturation magnetization once the magnet is removed. The main application of this ink is for Magnetic Ink Character Recognition (MICR) used for checks processing.

In embodiments, the metal nanoparticles herein can be superparamagnetic inks. Superparamagnetic inks are also magnetized in the presence of a magnetic field but they lose their magnetization in the absence of a magnetic field. The main application of superparamagnetic inks is for security printing, although not limited. In this case, an ink containing, for example, magnetic particles as described herein and carbon black appears as a normal black ink but the magnetic properties can be detected by using a magnetic sensor or a magnetic imaging device. Alternatively, a metal detecting device may be used for authenticating the magnetic metal property of secure prints prepared with this ink. A process for superparamagnetic image character recognition (i.e. using superparamagnetic inks) for magnetic sensing is described in U.S. Pat. No. 5,667,924, which is hereby incorporated by reference herein in its entirety.

As described above, the metal nanoparticles herein can be ferromagnetic or superparamagnetic. Superparamagnetic nanoparticles have a remanent magnetization of zero after being magnetized by a magnet. Ferromagnetic nanoparticles have a remanent magnetization of greater than zero after being magnetized by a magnet; that is, ferromagnetic nanoparticles maintain a fraction of the magnetization induced by the magnet. The superparamagnetic or ferromagnetic property of a nanoparticle is generally a function of several factors including size, shape, material selection, and temperature. For a given material, at a given temperature, the coercivity (i.e. ferromagnetic behaviour) is maximized at a critical particle size corresponding to the transition from multidomain to single domain structure. This critical size is referred to as the critical magnetic domain size (Dc, spherical). In the single domain range there is a sharp decrease of the coercivity and remanent magnetization when decreasing the particle size, due to thermal relaxation. Further decrease of the particle size results in complete loss of induced magnetization because the thermal effect become dominant and are sufficiently strong to demagnetize previously magnetically saturated nanoparticles. Superparamagnetic nanoparticles have zero remanence and coercivity. Particles of a size of about and above the Dc are ferromagnetic. For example, at room temperature, the Dc for iron is about 15 nanometers for fcc cobalt is about 7 nanometers and for Nickel the value is about 55 nm. Further, iron nanoparticles having a particle size of 3, 8, and 13 nanometers are superparamagnetic while iron nanoparticles having a particle size of 18 to 40 nanometers are ferromagnetic. For alloys, the Dc value may change depending on the materials. For additional discussion of such details, see U.S. Patent Publication No. 20090321676 to Breton et al.; Burke, et al., Chemistry of Materials, pp. 4752-4761 (2002); B. D. Cullity and C. D. Graham, Introduction to Magnetic Materials, IEEE Press (Wiley), $2^{nd}$ Ed., Chapter 11, Fine Particles and Thin Films, pp. 359-364 (2009); Lu et al. Angew. Chem. Int. Ed. 46:1222-444 (2007), Magnetic Nanoparticles: Synthesis, Protection, Functionalization and Application, which are all hereby incorporated by reference herein in their entirety.

In embodiments, the nanoparticles may be a magnetic metallic nanoparticle, or a ferromagnetic nanoparticle that includes, for example, Co and Fe (cubic), among others. Others include Mn, Ni and/or alloys made of all of the foregoing. Additionally, the magnetic nanoparticles may be bimetallic or trimetallic, or a mixture thereof. Examples of suitable bimetallic magnetic nanoparticles include, without limitation, CoPt, fcc phase FePt, fct phase FePt, FeCo, MnAl, MnBi, mixtures thereof, and the like. Examples of trimetallic nanoparticles can include, without limitation tri-mixtures of the above magnetic nanoparticles, or core/shell structures that form trimetallic nanoparticles such as Co-covered fct phase FePt.

The magnetic nanoparticles may be prepared by any method known in the art, including ball-milling attrition of larger particles (a common method used in nano-sized pigment production), followed by annealing. The annealing is generally necessary because ball milling produces amorphous nanoparticles, which need to be subsequently crystallized into the required single crystal form. The nanoparticles can also be made directly by RF plasma. Appropriate large-scale RF plasma reactors are available from Tekna Plasma Systems (Sherbrooke, Québec). The nanoparticles can also be made by a number of in situ methods in solvents in presence of suitable coating materials like surfactants.

The average particle size of the magnetic nanoparticles may be, for example, about 3 nm to about 300 nm in size in all dimensions. They can be of any shape including spheres, cubes and hexagons. In one embodiment, the nanoparticles are about 5 nm to about 500 nm in size, such as from about 10 nm to about 300 nm, or from 20 nm to about 250 nm, although the amount can be outside of these ranges. Herein, "average" particle size is typically represented as $d_{50}$, or defined as the median particle size value at the $50^{th}$ percentile of the particle size distribution, wherein 50% of the particles in the distribution are greater than the $d_{50}$ particle size value, and the other 50% of the particles in the distribution are less than the $d_{50}$ value. Average particle size can be measured by methods that use light scattering technology to infer particle size, such as Dynamic Light Scattering. The particle diameter refers to the length of the pigment particle as derived from images of the particles generated by Transmission Electron Microscopy (TEM) or from Dynamic Light Scattering measurements.

The magnetic nanoparticles may be in any shape. Exemplary shapes of the magnetic nanoparticles can include, for example, without limitation, needle-shape, granular, globular, platelet-shaped, acicular, columnar, octahedral, dodecahedral, tubular, cubical, hexagonal, oval, spherical, densdritic, prismatic, amorphous shapes, and the like. An amorphous shape is defined in the context of the present invention as an ill-defined shape having recognizable shape. For example an amorphous shape has no clear edges or angles. The ratio of the major to minor size axis of the single nanocrystal ($D_{major}/D_{minor}$) can be less than about 10:1, such as from about less than about 3:2, or less than about 2:1.

The loading requirements of the magnetic nanoparticles in the ink may be from about 0.5 weight percent to about 30 weight percent, such as from about 5 weight percent to about 10 weight percent, or from about 6 weight percent to about 8 weight percent, although the amount can be outside of these ranges.

The magnetic nanoparticle can have a remanence of about 20 emu/g to about 100 emu/g, such as from about 30 emu/g to about 80 emu/g, or about 50 emu/g to about 70 emu/g, although the amount can be outside of these ranges.

The coercivity of the magnetic nanoparticle can be, for example, about 200 Oersteds to about 50,000 Oersteds, such as from about 1,000 Oersteds to about 40,000 Oersteds, or from about 10,000 Oersteds to about 20,000 Oersteds, although the amount can be outside of these ranges.

The magnetic saturation moment may be, for example, about 20 emu/g to about 150 emu/g, such as from about 30 emu/g to about 120 emu/g, or from about 40 emu/g to about 80 emu/g, although the amount can be outside of these ranges.

Examples of suitable magnetic nanoparticle compositions with large magnetocrystalline anisotropy, K1 and which are suitable for coating with protective coatings are disclosed in U.S. Patent Publication No. 20090321676, which is hereby incorporated by reference in its entirety.

Binder Resin

The ink composition according to the present disclosure may also include one or more binder resins. The binder resin may be any suitable agent. Suitable binder resins include, without limitation, a maleic modified rosin ester (BECKACITE 4503 resin from Arizona chemical company), phenolics, maleics, modified phenolics, rosin ester, modified rosin, phenolic modified ester resins, rosin modified hydrocarbon resins, hydrocarbon resins, terpene phenolic resins, terpene modified hydrocarbon resins, polyamide resins, tall oil rosins, polyterpene resins, hydrocarbon modified terpene resins, acrylic and acrylic modified resins and similar resins or rosin known to be used in printing inks, coatings and paints, and the like.

Other suitable binder resins include, without limitation, thermoplastic resins, homopolymers of styrene or substituted styrenes such as polystyrene, polychloroethylene, and polyvinyltoluene; styrene copolymers such as styrene-p-chlorostyrene copolymer, styrene-propylene copolymer, styrene-vinyltoluene copolymer, styrene-vinylnaphthalene copolymer, styrene-methyl acrylate copolymer, styrene-ethyl acrylate copolymer, styrene-butyl acrylate copolymer, styrene-octyl acrylate copolymer, styrene-methyl methacrylate copolymer, styrene-ethyl methacrylate copolymer, styrene-butyl methacrylate copolymer, styrene-methyl α-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer, styrene-acrylonitrile-indene copolymer, styrene-maleic acid copolymer, and styrene-maleic acid ester copolymer; polymethyl methacrylate; polybutyl methacrylate; polyvinyl chloride; polyvinyl acetate; polyethylene; polypropylene; polyester; polyvinyl butyral; polyacrylic resin; rosin; modified rosin; terpene resin; phenolic resin; aliphatic or aliphatic hydrocarbon resin; aromatic petroleum resin; chlorinated paraffin; paraffin wax, and the like. These binder resins can be used alone or in combination.

The molecular weight, molecular weight distribution, cross-linking degree and other properties of each of the above binder resins are selected in accordance with the desired melt viscosity of the ink to be obtained.

One or more waxes may be added to the MICR inkjet ink in order to raise the image density and to effectively prevent the offset to a reading head and the image smearing. The wax can be present in an amount of, for example, from about 0.1 to about 10 weight percent, or from about 1 to about 6 weight percent based on the total weight of the ink composition, although the amount can be outside of these ranges. Examples of suitable waxes include, but are not limited to, polyolefin waxes, such as low molecular weight polyethylene, polypropylene, copolymers thereof and mixtures thereof; Other examples include a polyethylene wax, a polypropylene wax, a fluorocarbon-based wax, or Fischer-Tropsch wax, paraffin, and bio-derived wax although other waxes can also be used. The wax may, for example, help prevent offset to a reading head and image smearing.

Colorants

The MICR ink as prepared is either black or dark brown. In further embodiments, the MICR ink according to the present disclosure may be further produced as a colored ink by adding a colorant during ink production. Alternatively, a MICR ink lacking a colorant may be printed on a substrate during a first pass, followed by a second pass, wherein a colored ink that is lacking MICR particles is printed directly over the colored ink, so as to render the colored ink MICR-readable. This can be achieved through any means known in the art. For example, each ink can be stored in a separate reservoir. The printing system delivers each ink separately to the substrate, and the two inks interact. The inks may be delivered to the substrate simultaneously or consecutively. Any desired or effective colorant can be employed in the ink compositions, including pigment, dye, mixtures of pigment and dye, mixtures of pigments, mixtures of dyes, and the like. The coated magnetic nanoparticles may also, in embodiments, impart some or all of the colorant properties to the ink composition.

Suitable colorants for use in the MICR ink according to the present disclosure include, without limitation, carbon black, lamp black, iron black, ultramarine, Nigrosine dye, Aniline Blue, Du Pont Oil Red, Quinoline Yellow, Methylene Blue Chloride, Phthalocyanine Blue, Phthalocyanine Green, Rhodamine 6C Lake, Chrome Yellow, quinacridone, Benzidine Yellow, Malachite Green, Hansa Yellow C, Malachite Green hexalate, oil black, azo oil black, Rose Bengale, monoazo pigments, disazo pigments, trisazo pigments, tertiary-ammonium salts, metallic salts of salicylic acid and salicylic acid derivatives, Fast Yellow G3, Hansa Brilliant Yellow 5GX, Disazo Yellow AAA, Naphthol Red HFG, Lake Red C, Benzimidazolone Carmine HF3CS, Dioxazine Violet, Benzimidazolone Brown HFR. Aniline Black, titanium oxide, Tartrazine Lake, Rhodamine 6G Lake, Methyl Violet Lake, Basic 6G Lake, Brilliant Green lakes, Hansa Yellow, Naphtol Yellow, Watching Red, Rhodamine B, Methylene Blue, Victoria Blue, Ultramarine Blue, and the like.

The amount of colorant can vary over a wide range, for instance, from about 0.1 to about 50 weight percent, or from about 3 to about 20 weight percent, and combinations of colorants may be used.

Antioxidant

The ink composition can also optionally contain an antioxidant. The optional antioxidants of the ink compositions protect the images from oxidation and also protect the ink components from oxidation during the heating portion of the ink preparation process. Specific examples of suitable antioxidants include NAUGUARD® series of antioxidants such as NAUGUARD® 445, NAUGUARD® 524, NAUGUARD® 76, and NAUGUARD® 512 (commercially available from Chemtura Corporation (Philadelphia, Pa.)), the IRGANOX® series of antioxidants such as IRGANOX® 1010 (commercially available from BASF), and the like. When present, the optional antioxidant can be present in the ink in any desired or effective amount, such as in an amount of from at least about 0.01 to about 20 percent by weight of the ink, such as about 0.1 to about 5 percent by weight of the ink, or from about 1 to about 3 percent by weight of the ink, although the amount can be outside of these ranges.

Viscosity Modifier

The ink composition can also optionally contain a viscosity modifier. Examples of suitable viscosity modifiers include aliphatic ketones, such as stearone, and the like, polymers such as polystyrene, polymethylmethacrylate, thickening agents such as those available from BYK Chemie, and others. When present, the optional viscosity modifier can be present in the ink in any desired or effective amount, such as about 0.1 to about 99 percent by weight of the ink, such as about 1 to about 30 percent by weight of the ink, or about 10 to about 15 percent by weight of the ink, although the amount can be outside of these ranges.

Dispersants

Dispersant may be optionally present in then ink formulation. The role of the dispersant is to further ensure improved dispersion stability of the coated magnetic nanoparticles by stabilizing interactions with the coating material. Suitable dispersant include surfactants typically used in various solvent-based processes including, but not limited to, oleic acid, oleyl amine, trioctyl phosphine oxide (TOPO), hexyl phosphonic acid (HPA); polyvinylpyrrolidone (PVP), block copolymer dispersants comprising pigment-philic block and solvent-philic block, such as those sold under the name SOLSPERSE® such as Solsperse® 16000, Solsperse® 28000, Solsperse® 32500, Solsperse® 38500, Solsperse® 39000, Solsperse® 54000, Solsperse® 17000, Solsperse® 17940 from Lubrizol Corporation, beta-hydroxy carboxylic acids and their esters containing long linear, cyclic or branched aliphatic chains, such as those having about 5 to about 60 carbons, such as pentyl, hexyl, cyclohexyl, heptyl, octyl, nonyl, decyl, undecyl, and the like; sorbitol esters with long chain aliphatic carboxylic acids such as lauric acid, oleic acid (SPAN® 85), palmitic acid (SPAN® 40), and stearic acid (SPAN® 60); polymeric compounds such as polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), and combinations thereof. In embodiments, the dispersant is selected from the group consisting of oleic acid, lauric acid, palmitic acid, stearic acid, trioctyl phosphine oxide, hexyl phosphonic acid, polyvinylpyrrolidone, poly(1-vinylpyrrolidone)-graft-(1-hexadecene), poly(1-vinylpyrrolidone)-graft-(1-triacontene), poly(1-vinylpyrrolidone-co-acrylic acid), pentyl, hexyl, cyclohexyl, heptyl, octyl, nonyl, decyl, or undecyl beta-hydroxy carboxylic acid and combinations thereof. Further examples of suitable dispersants may include Disperbyk 108, Disperbyk 116, (ex Byk) Borch GEN 911, Ircopserse 2153 and 2155 (ex Lubrizol), acid and acid ester waxes from Clariant, for example Licowax S. Suitable dispersants are described in pending applications U.S. patent application Ser. No. 12/641,564, filed Dec. 18, 2009, U.S. patent application Ser. No. 12/891,619, filed Sep. 27, 2010, and U.S. Patent Publication No. 2010/0292467, the entireties of which are hereby incorporated by reference.

The dispersant may be the same or different when compared with the surfactant present, in some embodiments, on the surface of the particle prior to ink preparation.

A suitable amount of dispersant can be selected, such as in an amount of about 0.1 to about 20 weight percent, such as from about 0.5 to about 12 weight percent of the ink weight, although the amount can be outside of these ranges. The choice of particular dispersants or combinations thereof as well as the amounts of each to be used are within the purview of those skilled in the art.

Synergist

Specific examples of commercially available synergists include Solsperse® 22000 and Solsperse® 5000 (Lubrizol Advance Materials, Inc.). Although in embodiments where the surface coating comprises surfactants, the dispersant and/or synergist may not be needed. Thus, selection of the dispersant and/or synergist depends on the type of protective coating.

Preparation of Ink

The ink composition of the present disclosure can be prepared by any desired or suitable method. For example, the ink ingredients can be mixed together, followed by heating, typically to a temperature of from about 50° C. to about 140° C., although the temperature can be outside of this range, and stirring until a homogeneous ink composition is obtained, followed by cooling the ink to ambient temperature (typically from about 20° C. to about 25° C.). Other methods for making ink compositions are known in the art and will be apparent based on the present disclosure.

Printing of the Ink

The magnetic metal particle ink may generally be printed on a suitable substrate such as, without limitation, paper, glass art paper, bond paper, paperboard, Kraft paper, cardboard, semi-synthetic paper or plastic sheets, such as polyester or polyethylene sheets, and the like. These various substrates can be provided in their natural state, such as uncoated paper, or they can be provided in modified forms, such as coated or treated papers or cardboard, printed papers or cardboard, and the like.

Specific suitable papers include plain papers such as XEROX 4200 papers, XEROX Image Series papers, ruled notebook paper, bond paper, silica coated papers such as Sharp Company silica coated paper, JuJo paper, HAMMERMILL LASERPRINT paper, and the like, glossy coated papers such as XEROX Digital Color Gloss, Sappi Warren Papers LUSTROGLOSS, specialty papers such as Xerox DURAPAPER, and the like.

Further suitable materials may be used, including but not limited to, transparency materials, fabrics, textile products, plastics, polymeric films, inorganic recording mediums such as metals and wood, and the like, transparency materials, fabrics, textile products, plastics, polymeric films, inorganic substrates such as metals and wood, and the like.

For printing the ink on a substrate, any suitable printing method may be used. For example, suitable methods include, without limitation, roll-to-roll high volume analog printing methods, such as gravure, rotogravure, flexography, lithography, etching, screenprinting, and the like. Additionally, thermography, inkjet printing, or a combination thereof may be used. The ink may also be used for a piezo inkjet printer printer and ordinary instrument for writing. In a particular embodiment, the method used is inkjet printing.

The ink of the present disclosure may be used in both MICR and non-MICR applications.

The inks described herein are further illustrated in the following examples. All parts and percentages are by weight unless otherwise indicated.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Preparation of Solvent-Based Magnetic Ink with Carbon-Coated Ferromagnetic Nanoparticles A 30-ml brown bottle was filled with 10 g of Isopar M (solvent) and 1.0 g of oleic acid. The solution was heated gently and stirred, in order to solubilize the oleic acid. To this solution were added 2.5 g of carbon-coated iron nanoparticles (25 nm average size; commercially available from Nanoshel LLC (Wilmington, Del.). Prior to addition, the particles appear like large agglomerates (millimeter size). The solution was mixed with an IKA KS130 shaker to ensure wetting of the carbon coated iron aggregates (3 hours). 70 g of pre-cleaned ⅛ inch diameter 440C Grade 25 steel balls were added and the composition was ball-milled for 1 day in order to induce de-agglomeration of the carbon-coated iron nanoparticles. The average particle size of the particles in the ink was about 1 micron.

It is expected that smaller particles can be produced through selection of a more aggressive grinding process and appropriate dispersant additive. Particle attrition process typically provides higher energy input compared to the relatively small ball-milling scale which was used. It is expected that attrition using suitable media with optional heating provides particles of size below 300 nm.

Example 2

Magnetic Property

An experiment was carried out whereby the ink of Example 1 was exposed to air and such that no temperature increase or tendency to ignite was detected during the preparation procedures. The ink was attracted by a magnet, which proves that the iron nanoparticles maintained their magnetic properties after the ink processing steps.

Example 3

Coated Paper Tests

Samples of the presently disclosed solvent-based magnetic ink were made by coating Xerox 4200 paper with the liquid solvent ink with a blade and with a gap of 1 mil (25 microns) and 5 mil (125 microns). The amount of deposited ink on paper provided by coatings is significantly higher when compared with regular solid ink prints which have a typical thickness of about 5 microns. This arrangement was selected purposefully in order to provide a worst scenario case. If the ink passed this robustness test, then it would certainly be robust when printed as a thinner layer on paper, for example, in an actual printer.

Coated regular paper (Xerox 4200) with solvent-based composition from Example 3 was attracted by a magnet, further demonstrating that the magnetic properties were maintained on a printed page.

Example 4

Robustness Demonstration

Robustness was evaluated by two different methods: (1) crease (folding) test which evaluates print stability when folding the printed page; and (2) rubbing (smearing) test which evaluates robustness of the print upon rubbing.

Figure 4A:
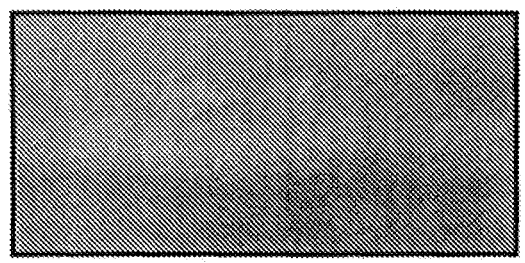
FIG. 4A illustrates a printed ink pattern performed with ink made according to the present embodiments.
Figure 4B:
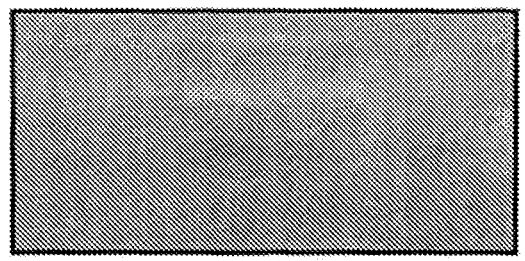
FIG. 4B illustrates the results of a fold test performed on the printed ink pattern of FIG. 4A.

Crease (Folding) test: FIGS. 4A and 4B provide a representation of a printed ink pattern of the present solvent based magnetic ink (FIG. 4A). The folding test of the solvent-based ink described herein revealed that no ink had been removed along and near the folding edge (FIG. 4B). This demonstrated an excellent crease performance of the solvent-based magnetic ink.

Rubbing (smearing) test: Replicate samples were made as described in Example 4 and subjected to a rubbing (smearing) test to evaluate the robustness of the present magnetic solvent ink prints. The test was performed with an Ink Rub Tester from Testing Machines Inc. A rectangle printed area was rubbed (200 cycles) against a white regular paper substrate and the samples compared in two ways:

1) transfer of ink from the print to the white paper;
2) appearance of the printed area after rubbing (evaluated as the potential flaking off of ink in the printed area)

No significant difference of before and after rubbing (200 cycles) of the printed solvent based magnetic ink pattern was detected visually with prints made with the magnetic solvent ink described herein. Further evaluation was carried by measuring the Optical Density Change (OD) of prints made with the present solvent magnetic before and after rubbing test. The OD before rubbing was 0.89 while after rubbing OD was 0.87. This shows that 98% of the initial OD of the sample was conserved after rubbing. Overall, the tests showed excellent (target is >90%) rubbing performance of magnetic solvent inks of the present disclosure.

Example 5 (Prophetic)

Preparation of Solvent-Based Magnetic Ink with Polymer Coated Magnetic Nanoparticles Polystyrene coated cobalt, nanoparticles are obtained by thermal decomposition of dicobalt octacarbonyl in dichlorobenzene as a solvent in the presence of a polystyrene polymer terminated with a phosphine oxide group, and an amine terminated polystyrene in a ratio of 4:1 (w/w) at 160 deg. C. under argon for 30 min. The reaction mixture is precipitated into hexane and further washed to provide polystyrene coated cobalt nanoparticles. The fabrication process is described in US2010/0015472 A1 (Bradshaw).

The procedure for preparation of a solvent based magnetic ink from Example 1 is repeated with polystyrene coated magnetic nanoparticles described above instead of carbon-coated magnetic nanoparticles.

Example 6 (Prophetic)

Preparation of Solvent-Based Magnetic Ink with Silica-Coated Magnetic Nanoparticles Silica coated iron nanoparticles of an average particle size of 300 nm are synthesized by reduction of $FeCl_3.6H_2O$ with $NaOH/N_2H_4.H_2O$ reducing agent. After washing with ethanol, a silica coating is deposited by using the Stöber method. In this procedure, the silica layer is deposited from a tetraethyl orthosilicate precursor, which is hydrolyzed in an ammonia/water mixture at apH of 8-9 for 4 hours at 40° C. The procedure for fabrication of silica coated iron nanoparticles is fully described by Ni et al., in Materials Chemistry and Physics 10: 206-212 (2010).

The procedure for preparation of a solvent based magnetic ink from Example 1 is repeated with silica-coated magnetic nanoparticles described above instead of carbon-coated magnetic nanoparticles.

Example 7 (Prophetic)

Preparation of Solvent-Based Magnetic Ink with Surfactant Coated Magnetic Nanoparticles Surfactant coated FeCo alloy magnetic nanoparticles of an average size of about 10 nm (as determined by TEM) are obtained by reductive decomposition of Fe(III) acetylacetonate and Co(II) acetylacetonate in a mixture of surfactants (oleic acid and trioctyl phosphine) in 1,2-hexadecanediol under a gas mixture of 93% Ar+7% $H_2$ at 300° C. The experimental procedure is fully described in J. Am. Chem. Soc. 120: 7214-5 (2007).

The procedure for preparation of a solvent based magnetic ink from Example 1 is repeated with surfactant-coated magnetic nanoparticles described above instead of carbon-coated magnetic nanoparticles.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A non-aqueous magnetic ink comprising:
   an organic solvent carrier present in an amount of from about 10 to about 90 percent by weight of the ink;
   coated magnetic nanoparticles, wherein the coated magnetic nanoparticles are comprised of a magnetic metal core and a protective coating deposited on the magnetic metal core comprising a carbon allotrope selected from the group consisting of glassy carbon, graphite, carbon nanofoam, diamond and mixtures thereof, and further wherein the coated magnetic nanoparticles are dispersed in the solvent carrier.

2. The magnetic ink of claim 1, wherein the magnetic nanoparticles are ferromagnetic or superparamagnetic.

3. The ink according to claim 1, wherein the magnetic metal core is selected from the group consisting of Fe, Mn, Co, Ni and mixtures thereof.

4. The ink according to claim 1, wherein the magnetic metal core is selected from the group consisting of FePt, Fe, Co, CoPt, Ni, MnAl and MnBi.

5. The ink according to claim 1, wherein the solvent carrier is selected from the group consisting of organic solvent is selected from the group consisting of isoparaffins, methanol, ethanol, n-propanol, n-butanol, benzyl alcohol, methyl cellosolve, ethyl cellosolve, acetone, methyl ethyl ketone, cyclohexanone, chlorobenzene, methyl acetate, n-butyl acetate, dioxane, tetrahydrofuran, methylene chloride and chloroform, and mixtures thereof.

6. The ink according to claim 1, wherein the dispersant is selected from the group consisting of oleic acid, oleyl amine, trioctyl phosphine oxide, hexyl phosphonic acid, beta-hydroxy carboxylic acids and their esters, sorbitol esters with long chain aliphatic carboxylic acids, polyvinylpyrrolidone and derivatives thereof, block copolymer dispersants comprising pigment-philic block and solvent-philic block, and mixtures thereof.

7. The ink according to claim 1, wherein the viscosity controlling agent is selected from the group consisting of aliphatic ketones, polystyrene, polymethylmethacrylate, and mixtures thereof.

8. The ink according to claim 1, wherein the protective coating has a thickness of from about 0.2 nm to about 100 nm.

9. The ink according to claim 1, wherein a size of the magnetic nanoparticles in all dimensions is from about 3 nm to about 300 nm.

10. The ink according to claim 1, wherein the magnetic metal core has a shape selected from the group consisting of needle-shaped, granular, globular cube, hexagonal, oval, spherical and amorphous.

11. A non-aqueous magnetic ink comprising:
a solvent carrier present in an amount of from about 10 to about 90 percent by weight of the ink;
coated magnetic nanoparticles comprising a magnetic metal core and a protective coating deposited on the magnetic metal core comprising a carbon allotrope selected from the group consisting of glassy carbon, graphite, carbon nanofoam, diamond and mixtures thereof, wherein the coated magnetic nanoparticles are dispersed in the solvent carrier and further wherein the ink is used for Magnetic Ink Character Recognition (MICR) applications.

12. A process for preparing a non-aqueous magnetic ink comprising:
(a) preparing a solution by combining an organic solvent, an optional dispersant, an optional synergist, and an optional colorant; and
(b) combining the solution of (a) with a coated magnetic nanoparticle comprising a magnetic core and a coating shell deposited on the magnetic core to form a magnetic ink, wherein the solvent carrier is present in an amount of from about 10 to about 90 percent by weight of the ink and the coating shell comprises a carbon allotrope selected from the group consisting of glassy carbon, graphite, carbon nanofoam, diamond and mixtures thereof.

13. The process of claim 12 further comprising filtering the magnetic ink.

14. The process of claim 12 further comprising treating the magnetic ink to control the size of the coated magnetic nanoparticles or to break up aggregations of carbon coated magnetic nanoparticles wherein treating comprises using a homogenizer, stirring, ball milling, attrition, media milling, microfluidizing, sonication, or mixtures thereof.

* * * * *